United States Patent [19]

Claxton et al.

[11] 4,004,270
[45] Jan. 18, 1977

[54] ELECTRONIC TIRE PRESSURE ALARM CIRCUITRY

[75] Inventors: William Eugene Claxton, Mogadore; James Dennis Gardner, Akron; Marvin Lynn Janssen, North Canton, all of Ohio

[73] Assignee: The Firestone Tire & Rubber Company, Akron, Ohio

[22] Filed: Feb. 17, 1976

[21] Appl. No.: 658,786

[52] U.S. Cl. .............................. 340/58; 340/409; 200/61.25

[51] Int. Cl.$^2$ ........................................ B60C 23/00

[58] Field of Search ................... 340/52 R, 58, 409; 200/61.25, 61.22

[56] References Cited

UNITED STATES PATENTS

| | | | |
|---|---|---|---|
| 2,450,450 | 10/1948 | Schmidinger | 340/409 |
| 3,252,135 | 5/1966 | Amundsen, Jr. | 340/58 |
| 3,825,891 | 7/1974 | Kinast | 340/52 A |

Primary Examiner—Alvin H. Waring

[57] ABSTRACT

An electronic alarm circuit indicates an abnormal pressure condition in a pneumatic tire on a vehicle. The circuit includes an indicator, either in the form of a light or sound buzzer, or both, which can transmit two distinguishable signals, one indicating the presence of an abnormal pressure condition and the other to test the circuit. An actuation circuit includes a normally open pressure switch which communicates with the internal pressure of the tire and closes upon the detection of the abnormal pressure to activate the indicator. The actuation circuit also includes a resistance connected across the pressure switch to provide a path for electrical current when the switch is open to provide the test signal, as may be desired.

12 Claims, 3 Drawing Figures

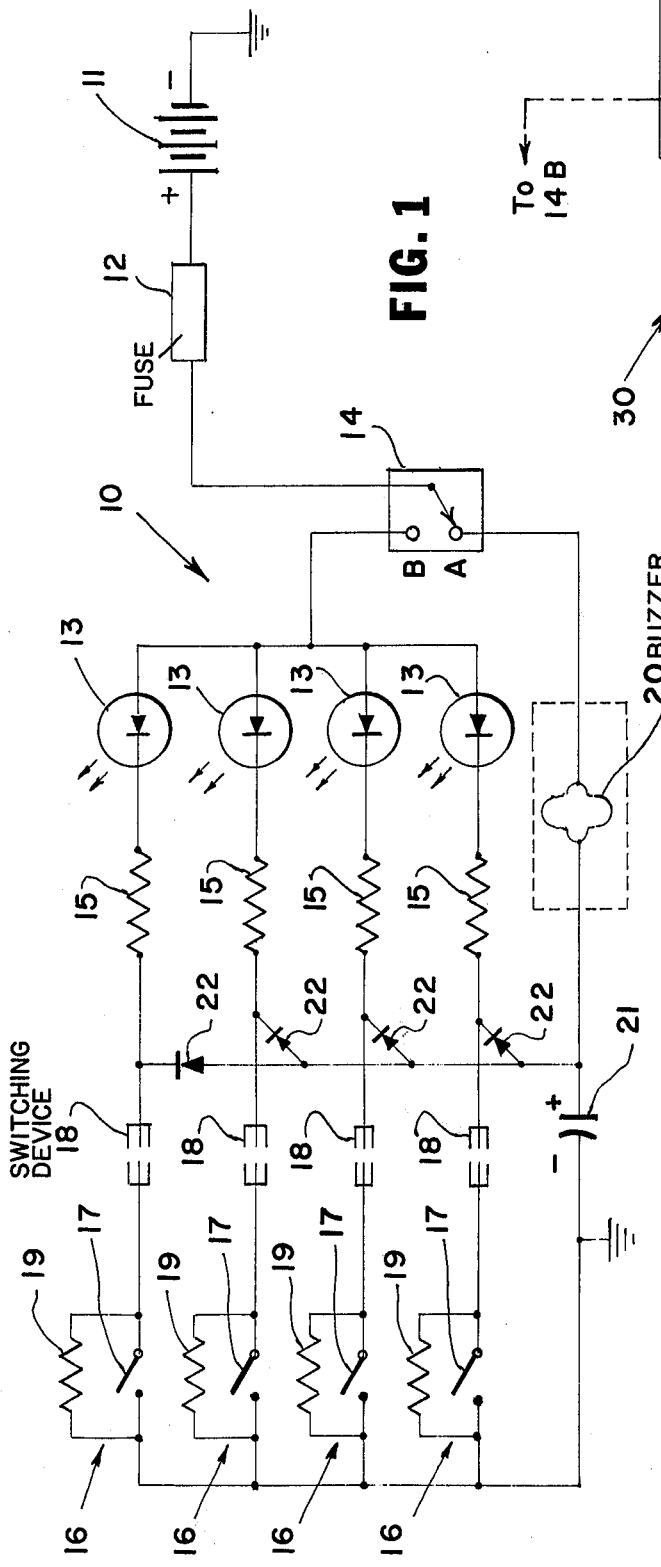
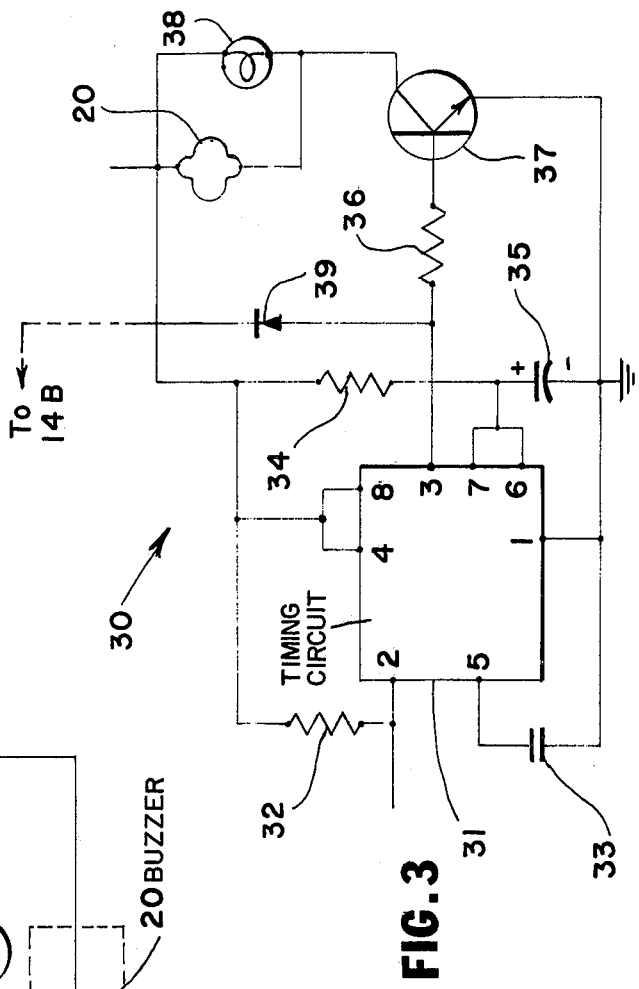
FIG. 1
FIG. 2
FIG. 3

ELECTRONIC TIRE PRESSURE ALARM CIRCUITRY

BACKGROUND OF THE INVENTION

This invention relates to an apparatus which will give an audio or visual indication to the operator of a vehicle of an abnormal pressure condition in a tire on the vehicle. More particularly, the invention relates to such an apparatus which is fully testable by the operator to assure that the components thereof are properly functioning.

An abnormal or undesirable pressure condition in a pneumatic tire, if undetected particularly in situations involving long trips or the like, can be quite detrimental to the tire and could also represent a hazard to the safe operation of the vehicle. A number of alarm circuits have been designed to detect abnormal pressure conditions. One such device detects an abnormal pressure condition by counting tire revolutions and comparing the same with those of a properly inflated tire. However, these devices are not satisfactorily workable with a radial tire, where pressure tolerance is highly important, because there is little tire deflection under slightly abnormal pressure conditions in the radial tire. Similarly, in the newly developed cast tire, there is very little deflection change related to pressure.

Other devices utilize radio circuits or ultrasonic systems to warn the operator of a vehicle of the undesirable pressure conditions. Such devices are quite susceptible, however, to spurious activation from other transmissions or total failure due to transmission blockage by the metallic portions of the vehicle body.

More recently a highly sophisticated system has been developed which utilizes a system of mirrors or the like to transmit light signals upon each revolution of the tire. Absence of such a signal, indicative of an abnormal tire pressure condition, triggers an alarm circuit. Such a system is described in pending application Ser. No. 581,392 filed May 27, 1975 and owned by the assignee of this application. Although it is possible that through a buildup of dirt or the like in the optical system discussed in that application, a malfunction could occur, that system is entirely workable under most conditions. However, because of the sophistication of that system, it is testable by the vehicle operator only when the vehicle is stopped or travelling at low speeds and, in addition, is more expensive to install and maintain.

SUMMARY OF THE INVENTION

It is therefore a primary object of the present invention to provide an electronic device for detecting an abnormal pressure condition in a pneumatic tire and alerting the operator of the vehicle of such condition.

It is another object of the present invention to provide a device, as above, which is fully testable to assure the operator of the vehicle of the satisfactory operation of the device.

It is a further object of the present invention to provide a device, as above, which will first indicate to the operator of the vehicle that there is an abnormal pressure condition in one of his tires and then specifically indicate the location of the problem.

It is yet another object of the present invention to provide a device, as above, which can utilize either an audio or visual alarm to alert the operator of the vehicle of the abnormal pressure condition.

It is still another object of the present invention to provide a device, as above, which utilizes minimum electrical current transfer thereby minimizing radio frequency interference problems.

It is an additional object of the present invention to provide a device, as above, which uses a periodic signal by means of an electrical connection between two contacts once each revolution of the tire to activate the circuit but which will not falsely activate the circuit should the contacts be aligned when the vehicle is stopped.

It is a still further object of the present invention to provide a device, as above, which is inexpensive to manufacture, install and maintain.

These and other objects of the present invention, which will become apparent from the description of the preferred embodiment, are accomplished by the means hereinafter described and claimed.

In general, the electronic alarm circuit for alerting the operator of a vehicle to an abnormal pressure condition in at least one of the tires thereof utilizes a power supply to activate an indicating device which is capable of providing a first identifiable signal indicative of an abnormal pressure condition in the tire and a second identifiable signal to test the circuit. An actuation circuit communicates with the internal pressure of the tire to activate the indicating device to provide the first identifiable signal upon the detection of abnormal pressure condition and to provide the second identifiable signal, as desired, to test the circuit.

BRIEF DESCRIPTION OF THE DRAWINGS

FIG. 1 is a schematic diagram of the electronic alarm circuitry according to the concept of the present invention.

FIG. 2 is a schematic diagram of additional circuitry which could be substituted for the portion of FIG. 1 enclosed in dotted lines.

FIG. 3 is another schematic diagram of additional circuitry which could be substituted for the portion of FIG. 1 enclosed in dotted lines.

DESCRIPTION OF THE PREFERRED EMBODIMENT

The electronic alarm circuit for alerting the operator of a vehicle of an abnormal pressure condition in at least one of the pneumatic tires of the vehicle is indicated generally by the numeral 10 in FIG. 1 and is depicted for use with a conventional passenger vehicle having four wheels. Thus, portions of the circuit 10 shown herein are repeated four times, once for each tire. It is to be understood, however, that circuit 10 could readily be adapted for use with vehicles, such as tractor-trailer rigs, which have a significantly greater number of wheels, merely by the addition of repetetive circuit components, as will hereinafter become evident.

Circuit 10 receives its voltage from a power supply 11, which can be the battery of the vehicle, through a fuse 12. The anodes of a plurality of light emitting diodes (LEDS) 13, one for each tire of the vehicle, can be connected directly to power supply 11 or, if preferred, can be connected to the power supply through a two position selector switch 14, the purpose of which being hereinafter described. The other side of each LED 13 can be connected through current limiting resistors 15 directly to an actuation circuit, indicated generally by the numeral 16, which includes a normally open pressure switch 17. Alternatively, and as shown in FIG. 1, an intermittent switching device schematically shown and indicated by the numeral 18, can be interposed therebetween.

Pressure switches 17 are conventional items, such as those manufactured by Texas Instruments, Inc., and carrying Model 20 PS000ABO28DO17D, which communicate with the internal pressure of the pneumatic tire and close upon the detection of a preset undesirable pressure condition. Switches 17, as described herein, are primarily used to detect a low pressure condition, such as 20 psi. However, a pressure switch could be provided which would detect either low or high pressure conditions, as may be desired.

Each actuation circuit 16 also includes a leakage resistor 19 which is wired across, that is in parallel with, each pressure switch 17. If switch 14 and intermittent switching devices 18 were not in the circuit, that is, if LEDS 13 were wired directly between power supply 11 and actuation circuit 16, each LED would glow faintly with pressure switch 17 open to provide an identifiable signal to the operator of the vehicle that the system was operable. Upon the detection of an abnormal pressure condition in one of the tires, the pressure switch 17 associated with that tire would close giving the LED 13 associated therewith much more current and a corresponding identifiable brighter light indicative of the abnormal condition.

The intermittent switching devices 18 can be provided in the circuit so that the LED signal, whether dim or bright, will only flash. This is advantageous, not only for a longer life of the LED, but also it may not be as distracting to the operator of the vehicle as would a continually glowing light. Each switching device 18 is an assembly which is associated with each tire to provide a signal once each revolution of the tire. Such a device can be an optical system, such as disclosed in pending applications Ser. Nos. 581,392 filed May 27, 1975 or 597,809 filed July 21, 1975 owned by the assignee of this application, to which reference is made to more fully understand the subject invention, or could be a more mechanical system such as a set of brush contacts one mounted on a rotating portion of the wheel and another on a stationary member near the wheel to contact each other once each revolution of the tire to complete the circuit. Such a device is shown in pending application Ser. No. 658,803 filed Feb. 17, 1976 and invented by William E. Claxton and John H. Troche, entitled "Apparatus for Completing an Electrical Circuit with a Rotating Assembly", and owned by the assignee of this application, to which reference is made to more fully understand the subject system. Whatever type system is employed, each intermittent switching device 18 will close once each revolution of the wheel so that each LED 13 will either flash dimly for test purposes or flash brightly indicating the abnormal pressure condition.

It may be desirable to provide an audible indication of the abnormal pressure condition instead of or in addition to the visual indication. As such, a sound buzzer 20 can be provided. If the sound buzzer 20 were utilized in lieu of LEDS 13, then again switch 14 would not necessarily be needed and buzzer 20 would be directly wired to power supply 11 through fuse 12. The other side of buzzer 20 is connected to ground through a relatively large capacitor 21 which serves the function of increasing the "on" time of buzzer 20. Buzzer 20 would also be connected to switching device 18. Thus, upon each revolution of the tire, an identifiably weak buzz would be heard at low speeds because of the current passing through resistors 19. Upon the closing of pressure switch 17, an identifiably loud buzz would be heard once each revolution of the tire, the length of which would be extended by the charge time of capacitor 21.

Because the single sound system may not be totally appealing to the operator of the vehicle, the ideal system is that which is shown in FIG. 1 wherein both the LEDS 13 and buzzer 20 are employed. With switch 14 in the A position, as shown in FIG. 1, LEDS 13 are out of the circuit and power supply 11 is connected to buzzer 20. Diodes 22 serve to isolate buzzer 20 from LEDS 13. With all switches 17 open, current will pass through buzzer 20 and diodes 22 but because of the resistors 19 of actuation circuit 16, it will be insufficient to sound the same. When an abnormal pressure condition occurs in one or more of the tires, the corresponding pressure switch or switches 17 of actuation circuit 16 will close to provide a direct path to ground and hence the buzzer will sound once each revolution of the tire. Capacitor 21 will discharge each revolution under these conditions. Recharging of capacitor 21 will then occur with the charging current through buzzer 20 keeping it on for a sufficiently long time for it to be distinctly heard. The operator of the vehicle may then turn switch 14 to the B position at which time the buzzer will cease sounding and the LED 13 associated with the tire suffering the abnormal pressure condition will glow brightly identifying the tire at the abnormal pressure.

The B position of switch 14 is also used to test the system. Under normal pressure conditions, with switch 14 in the B position, because of resistors 19, each LED 13 will flash once each revolution of the tire with an identifiably dim glow to prove the system operable. Thus, the B position not only serves to identify which tire may be suffering from an abnormal pressure condition, but also to test the operability of the system.

While the specific components used in the circuit of FIG. 1 are not highly critical thereto, it is important that the currents be properly divided so that the system will operate as just described. Various components which have been found acceptable are as follows: The LEDS 13 found suitable for this application are Model No. CM4-22 manufactured by Chicago Miniature/Drake Manufacturing Company of Chicago, Ill. with buzzer 20 being an RMB-12 manufactured by Citizen America Corporation of Santa Monica, Calif. The identifiable test and alert signals can be obtained with resistors 19 having a value in the range of 4K ohms to 15K ohms, preferably about 10K ohms with resistors 15 being significantly smaller, in the area of 120 ohms. With the conventional 12 volt power supply 11 and switch 14 in the A position, there would normally be about 1 milliamp of current through buzzer 20, insufficient to operate the same. However, with a pressure switch 17 closed and 12 volts across buzzer 20, it will draw about 25 milliamps, sufficient to sound the same loudly. Similarly, with switch 14 in the B position, the small current through LEDS 13 with pressure switches 17 open will be sufficient to light the LEDS dimly. The almost 12 volts across an LED 13, when the corresponding pressure switch 17 is closed, will cause that LED to glow brightly. With switch 14 in the A position, if the vehicle were stopped in the extreme coincidental position that all four switching devices 18 would close, a current of about 5 milliamps would flow through buzzer 20. Upon this highly unlikely condition, it is possible that a very low sound could be heard from buzzer 20 although with the particular buzzer chosen, as described above, usually about 10 milliamps is needed for an audible signal.

The unlikely occurrence of multiple of the switching devices 18 closing due to coincidental line-up of the contacts at each wheel is rendered somewhat more probably on a vehicle having significantly more tires, like the truck rig which could have up to 26 tires or more. The coincidental closing of a plurality of switching devices 18 for such a vehicle could falsely trigger buzzer 20. To avoid this occurrence, the NPN transistor clamp circuit, indicated generally by the numeral 23 and shown in FIG. 2 could be provided. Clamp circuit 23 would replace the portion of FIG. 1 enclosed in dotted lines and includes a transistor 24 whose collector is connected to the power supply through current limiting resistor 25 and whose emitter is connected to ground. The base of transistor 24 connected on the side of FIG. 1 toward capacitor 21 is normally kept at a relatively high voltage by virtue of resistor 26 which is preferably in the range of 10K ohms to 27K ohms. This maintains transistor 24 conducting under normal tire pressure conditions. Since there is essentially a closed circuit between the collector and emitter of transistor 24 under these conditions, the collector will be at essentially zero volts and being connected to the base of a transistor 27, transistor 24 maintains transistor 27 non-conducting to keep buzzer 20 off. When an abnormal pressure condition causes one of the pressure switches 17 to close, the base of transistor 24 will be pulled to ground each revolution of the tire thus causing transistor 24 to go into a non-conducting state which, in turn, causes transistor 27 to conduct thereby sounding buzzer 20 connected to power supply 11. As before, capacitor 21 will lengthen the sound time of the buzzer. However, should a great number of switching devices coincidentally close upon stopping the multi-wheeled vehicle, clamping circuit 23 will not permit buzzer 20 to sound.

If it would be desirable to maintain the identifiable bright light or loud buzzing condition for a longer period of time, rather than the intermittent flashing which would occur utilizing the circuit of FIG. 1, the triggering circuit indicated generally by the numeral 30 in FIG. 3 could be substituted for the portion of FIG. 1 enclosed in dotted lines. Triggering circuit 30 includes a conventional timing circuit 31 available from a number of commercial sources carrying device No. 555. As is well known in the art and described in literature supplied by the manufacturers of these devices, timing circuit 31 has eight input and output pins so that it may be used for a plurality of functions. The numbers within the block designating timing circuit 31 represent these pin connections. Basically, circuit 31 is wired as a monostable multivibrator with the trigger input, pin 2, being connected in FIG. 1 next to capacitor 21 and diodes 22. Trigger input pin 2 will normally be kept high due to pull-up resistor 32 which is on the order of 10K ohms. Under these conditions, pin 3, the output of circuit 31, will be low, near zero volts. As to the other pin connections, pin 1 is grounded; pin 8 is connected to the power supply 11; pin 5, which is not used in this application, is grounded through capacitor 33; pin 4, which normally has the function of resetting circuit 31, is likewise not used in this application and is merely tied to pin 8; and pins 6 and 7 are connected to the intersection of the timing resistance-capacitive components 34 and 35, respectively.

With normal tire pressure conditions, pin 3 will be low, as previously described. The pin 3 output of circuit 31 is received, through base resistor 36, by power transistor 37 which will be non-conducting when pin 3 is low. When an abnormal pressure condition occurs, the closing of a pressure switch 17 will pull pin 2 of circuit 31 low on each revolution of the tire keeping the output at pin 3 high substantially continuously by virtue of the on-time dictated by the time constant of resistor 34 and capacitor 35. A high voltage at pin 3 turns on power transistor 37. The collector of transistor 37 is connected to one side of buzzer 20, the other side being connected to power supply 11 through switch 14. When transistor 37 is conducting, buzzer 20 will alarm and if desired, a conventional incandescent bulb 38 can be utilized to illuminate a message panel, such as, "TIRE PRESSURE." As shown, the high pin 3 output can also be routed through isolation diode 39 to position B of switch 14 to automatically cause the LED 13 associated with the bad tire to illuminate brightly. Thus, a continuous signal or signals may be maintained. In order to avoid the potential annoyance of the continual sounding of the buzzer, switch 14 can be placed in the B position to turn off the sound but keeping the LED flashing to remind the operator of the abnormal pressure condition.

It should thus be evident that the electronic alarm circuit disclosed herein is fully testable and capable of providing an alarm when an abnormal tire pressure is encountered, thus substantially improving the art and otherwise accomplishing the objects of the present invention.

We claim:
1. An electronic alarm circuit for indicating an abnormal pressure condition in a pneumatic tire on a vehicle comprising, power means providing an output signal, indicator means electrically connected to said power means to provide a first identifiable signal indicative of an abnormal pressure condition in the pneumatic tire and a second identifiable signal to test the circuit, actuation means electrically connected to said indicator means and communicating with the internal pressure of the tire to activate said indicator means to provide said first and second identifiable signals and intermittent switch means electrically connected between said indicator means and said actuation means and closing once each revolution of the tire so that said first and second identifiable signals are intermittent.

2. Apparatus according to claim 1 wherein said actuation means includes normally open pressure switch means electrically connected to said indicator means and communicating with the internal pressure of the tire, said pressure switch means closing upon the detection of an abnormal pressure condition to activate said indicator means to provide said first identifiable signal, said actuation means also including resistance means connected across said pressure switch means to provide a path for electrical current to activate said indicator means to provide said second identifiable signal.

3. Apparatus according to claim 1 wherein said indicator means provides visual signals, said first identifiable signal being brighter than said second identifiable signal.

4. Apparatus according to claim 1 wherein said indicator means provides audible signals, said first identifiable signal being louder than said second identifiable signal.

5. Apparatus according to claim 1 wherein the vehicle has a plurality of pneumatic tires and said indicator means includes a light source for each tire providing said first and second identifiable signals and a sound source providing a said first identifiable signal.

6. Apparatus according to claim 5, there being an intermittent switch means for each tire, and further comprising capacitor means connected to said sound source to extend the length of time of said first identifiable signal of said sound source.

7. Apparatus according to claim 6 further comprising clamp circuit means connected between said intermittent switch means and said sound source to prevent said actuation means from providing said first identifiable signal of said sound source upon the coincidental closing of a plurality of said intermittent switch means.

8. Apparatus according to claim 6 further comprising circuit means connected between said intermittent switch means and said sound source to substantially prevent said first identifiable signal of said sound source from being intermittent.

9. Apparatus for indicating an abnormal pressure condition in any of a plurality of pneumatic tires on a vehicle comprising, power means providing an output signal, indicator means electrically connected to said power means and including a light source for each tire providing a first identifiable signal indicative of an abnormal pressure condition in a pneumatic tire and a second identifiable signal to test the circuit, said indicator means also including a sound source providing a said first identifiable signal, actuation means electrically connected to said indicator means and communicating with the internal pressure of the tire to activate said indicator means to provide said first and second identifiable signals, and selector switch means connected between said power means and said indicator means, said selector switch means having a first position to connect said sound source to said power means and a second position to connect each said light source to said power means.

10. Apparatus according to claim 9 wherein there is an actuation means for each tire, each said actuation means including normally open pressure switch means electrically connected to a said light source and said sound source and communicating with the internal pressure of its tire, a said pressure switch means closing upon the detection of an abnormal pressure condition in a pneumatic tire to activate said sound source when said selector switch means is in said first position, and activating said light source to provide said first identifiable signal when said selector switch means is in said second position.

11. Apparatus according to claim 10 wherein each said actuation means further includes resistance means connected across each said pressure switch means to provide paths for electrical current to activate said light source to provide said second identifiable signal when said selector switch means is in said second position.

12. Apparatus according to claim 11 further comprising intermittent switch means for each tire between said indicator means and each said actuation means, each intermittent switch means closing once each revolution of its tire so that the first and second identifiable signals are intermittent.

* * * * *